Patented May 11, 1943

2,318,780

UNITED STATES PATENT OFFICE 2,318,780

COATING COMPOSITION

James Willard Humphrey, Claymont, Del., assignor to American Viscose Corporation, Wilmington, Del., a corporation of Delaware No Drawing. Application October 18, 1940,
Serial No. 361,717

4 Claims. (Cl. 260—42)

This invention relates to coating compositions and articles to which the coating composition has been applied. More particularly, this invention relates to protective coating compositions and articles to which they have been applied.

The invention has for its principal object to provide a protective coating composition which when applied to an article forms a surface which is flexible, tough and resistant to chemicals.

Another object of the invention is to provide articles having a securely bonded, protective coating which is flexible, tough and resistant to chemicals.

Other objects of the invention will be apparent from the following description and accompanying claims.

It is found that a satisfactory coating composition may be prepared by dissolving polymeric butyl methacrylate, copolymers of vinyl chloride and vinyl acetate, which are known in the trade as Vinylite, and chlorinated diphenyl preferably of the type solid at ordinary temperatures, which is known in the trade as Aroclor, in a suitable solvent. An inert solvent having a boiling point of approximately 114° C., such as methyl isobutyl ketone, or a petroleum fraction, such as that known in the trade as Solvesso No. 2, is preferable although other solvents may be used.

The coating composition may be applied to the article to be coated by either spraying, brushing or dipping. The thickness of the coating is determined by the amount of solvent that is used.

As the coating composition is resistant to chemicals and forms a strong bond with either metal or wood, it is particularly suited for coating parts that are exposed to chemicals such as acids, alkalies and bleaching agents, including chlorine and hypochlorite solutions. The coating composition may also be used for decorative purposes as it is substantially unaffected by light and may be dyed or colored by adding pigments such as titanium dioxide or the like. Also, as the coating composition forms a surface that is flexible, tough and substantially impervious to water, it is well suited for coating fabric or other flexible sheet material. The coated fabric may be used in making rain coats, hand bags, table coverings and the like.

The following example is illustrative of the invention:

A coating composition is prepared by reducing two parts of polymeric butyl methacrylate, one part of copolymers of vinyl chloride and vinyl acetate and 0.75 parts of normally solid chlorinated diphenyl to granular form and then dissolving in methyl isobutyl ketone.

While a preferred embodiment of the invention has been shown, it is to be understood that changes and variations may be made in the proportions of the components and the solvent that is used without departing from the spirit and scope of the invention as defined by the appended claims.

What I claim is:

1. A protective coating composition comprising approximately two parts polymerized butyl methacrylate, approximately one part copolymers of vinyl chloride and vinyl acetate and approximately three-fourths part normally solid chlorinated diphenyl.

2. An article of manufacture having a protective coating comprising approximately two parts polymerized butyl methacrylate, approximately one part copolymers of vinyl chloride and vinyl acetate and approximately three-fourths part normally solid chlorinated diphenyl.

3. A flexible article of manufacture having a protective coating comprising approximately two parts polymerized butyl methacrylate, approximately one part copolymers of vinyl chloride and vinyl acetate and approximately three-fourths part normally solid chlorinated diphenyl.

4. Flexible sheet material having a protective coating comprising approximately two parts polymerized butyl methacrylate, approximately one part copolymers of vinyl chloride and vinyl acetate and approximately three-fourths part normally solid chlorinated diphenyl.

JAMES WILLARD HUMPHREY.